United States Patent
Barilá et al.

(10) Patent No.: US 7,283,923 B2
(45) Date of Patent: Oct. 16, 2007

(54) METHOD OF SPEED MEASURE ON TURBO SUPERCHARGERS OF INTERNAL COMBUSTION ENGINES BY MEANS OF VIBRATIONS ANALYSIS AND EQUIPMENT TO PERFORM IT

(76) Inventors: Daniel Oscar Barilá, Alfonsina Storni N° 60 Bo Pte Ortiz (km 5), Comodoro Rivadavia Chubut (AR) 9000; Pedro Daniel Kolodka, Saavedra 230, Comodoro Rivadavia-Chubut (AR); Alberto Eduardo Torres, Chacabuco 508, Comodoro Rivadavia Chubut (AR); Fernando Martin Vignolo, Carlos Gardel 1389, Comodoro Rivadavia Chubut (AR); Alejandro Federico Münnemann, Alem 609, Comodoro Rivadavia-Chubut (AR); Gerardo Daniel Ahrtz, Dorrego 747 "E", Comodoro Rivadavia-Chubut (AR); Luis Arturo Bugna, Alsina 574, (8000) Bahia Blanca-Buenos Aires (AR); Gustavo Gabriel Vignolo, Moreno 236-6° E, (8000) Bahia Blanca-Buenos Aires (AR)

( * ) Notice: Subject to any disclaimer, the term of this patent is extended or adjusted under 35 U.S.C. 154(b) by 0 days.

(21) Appl. No.: 11/365,204

(22) Filed: Feb. 28, 2006

(65) Prior Publication Data
US 2007/0016385 A1 Jan. 18, 2007

(30) Foreign Application Priority Data
Jul. 18, 2005 (AR) .......................... P20050102952

(51) Int. Cl.
*G01P 11/00* (2006.01)

(52) U.S. Cl. .......................... 702/142; 702/56; 702/76; 702/147; 702/77; 123/192.1; 73/660; 73/579; 60/322

(58) Field of Classification Search ........ 702/142–147, 702/198, 96, 126, 56, 76–77; 123/192.1; 701/100–101, 110–111, 115; 73/660–662, 73/570, 66, 579; 60/322
See application file for complete search history.

(56) References Cited

U.S. PATENT DOCUMENTS

| | | |
|---|---|---|
| 4,573,358 A | 3/1986 | Luongo |
| 4,887,468 A | 12/1989 | McKendree et al. |
| 5,206,816 A | 4/1993 | Hill et al. |
| 5,479,825 A | 1/1996 | Williams et al. |
| 5,483,833 A | 1/1996 | Dickens et al. |
| 6,584,949 B1 | 7/2003 | Franchi et al. |

*Primary Examiner*—John Barlow
*Assistant Examiner*—Hien Vo
(74) *Attorney, Agent, or Firm*—Bachman & LaPointe (57) ABSTRACT

A method of determining speed of rotation of a motor is provided. The method involves collecting samples with a measuring sensor at a sampling frequency, set on the basis of mechanical vibration of the motor, for the duration of a measurement period and storing the samples in the memory of a data carrier as measurement data of a fixed format. The speed of rotation of the motor is determined from the measurement data by determining the cycle length of a periodic vibration signal in the time domain by a maximum likelihood estimate calculated by maximizing a maximum likelihood function adjusted to the measurement data, the speed of rotation being obtained from the frequency point where the maximum likelihood function obtains its maximum value.

12 Claims, 4 Drawing Sheets

METHOD OF SPEED MEASURE ON TURBO SUPERCHARGERS OF INTERNAL COMBUSTION ENGINES BY MEANS OF VIBRATIONS ANALYSIS AND EQUIPMENT TO PERFORM IT

BACKGROUND OF THE INVENTION (1) Field of the Invention

In general, the present invention is linked to measurement techniques of functional parameters in combustion internal engines but, more specifically it is related to the signal processing method in order to implement a non intrusive tachometer for turbo-compressors and the measurement device used.

(2) Prior Art

U.S. Pat. No. 4,573,358 is a "device to detect vibrations in turbines blades". It consists of a plurality of sensors evenly distributed over a series of blades coupled to the periphery of a turbine disk. The sensors are able to provide a signal at the exit in answer to the passing of the blades. One of the blades is selected for monitoring to indicate the degree of relative location to an -x- reference at a certain distance constituting a small window. Thus, when the blade selected passes by a sensor its proper exit signal conditioned to form a pulse is registered during a period of time corresponding to the window. The sequential pulses of the sensors form a train of pulses modulated by each vibration of the blade. It has an FM sensor to demodulate the train of pulses and to derive the vibration information.

When analyzing this patent, an inconvenience arises: it can only discriminate the harmonic vibrations to half the number of sensors. Bigger harmonics are also detected but they appear as responses to smaller harmonics. This phenomenon of showing a bigger frequency harmonic as a smaller one is known as "aliasing": difficulty in the precision of conclusions.

On the other hand in this U.S. Pat. No. 4,573,358, sensors of proximity permanently installed in the machine are used. The plurality of sensors is spread in the periphery of the selected blades line. It can monitor a blade at any time, but it has the following problem: there are technical difficulties to install and mount the plurality of sensors needed inside the turbine. Besides it cannot separate the axis torsion vibrations and the asynchronous vibrations of the individual blades.

In U.S. Pat. No. 4,887,468, "a device used to determine vibrations in blades applicable to asynchronous turbines" is described. It describes the use of a maximum of two sensors mounted in circumference along a line of blades to detect the real time of arrival of the blades to the sensors. The estimated times of arrival of the blades to the sensors are determined and compared to those times measured in order to obtain the data deflexion referred to the blades. Then the harmonic analysis to determine the level of vibration of each non integral harmonic is performed.

It turns that in this patent Fourier's conventional analysis should be applied to determine the amplitude of the components of the vibration to each frequency. It happens that the system detects the presence of synchronous vibrations. Then obtaining only two tests doesn't provide enough information to discriminate among several integral harmonics.

U.S. Pat. No. 5,206,816 is "a system and method for monitoring synchronous vibrations of blades in turbo machines". At least three sensors able to detect the arrival of each blade, regarding the cylinder, are arranged around their tips. The location of the sensors is selected to minimize error influence on the data. To make the installation of the sensors inside the cylinder simpler, they can be displaced non-uniformly. This location has the purpose of building Fourier's transformations using the real times of arrival of each blade to each sensor expressed as a fraction of a revolution of the rotor. The transformations matrix is built for a predetermined discreet group of M harmonics so that they are analyzed simultaneously. The number of harmonics that can be simultaneously analyzed is relative to the number of sensors used. Information on the time of arrival of a blade to each sensor is expressed as a fraction of a revolution of the rotor. It is analyzed to determine the amplitude of the vibration of the blade of the harmonics selected by the group. Calculations are repeated for a group of harmonics to interpret the result exactly, in the event that a significant vibration of a harmonic not included in the initial group arises.

U.S. Pat. No. 5,479,825 "system of microwaves for monitoring vibrations in blades of turbines by means of the continuous transmission of energy waves in microwaves".

U.S. Pat. No. 5,483,833, refers to "a method and apparatus for monitoring aircraft components". Operability of aircraft mechanical components is monitored by analyzing the voltage output of an electrical generator of the aircraft. Alternative generators, for a turbine-driven rotor aircraft, include the gas producer turbine tachometer generator, the power turbine tachometer generator, and the aircraft systems power producing starter/generator. Changes in the peak amplitudes of the fundamental frequency and its harmonics are correlated to changes in condition of the mechanical components.

U.S. Pat. No. 6,584,949 refers to the "vibration analysis of rotating blades" of the gas turbine type. It describes a method that includes the steps for providing a strain gage on one of the blades and that provides either one or two test tips located in a space around the blades. The strain gage data allow the vibration of a single blade to be completely characterized, while the data from the test tips allow the amplitude or speed of all the blades to be determined. The relationship between the data from the test points for a single blade and the data from the strain gage can be established. This relationship can be assumed to apply to all the blades and in this way the strain induced by the vibration will be determined in all blades. Because of its own characteristics the previous work doesn't interfere with the present invention.

Therefore all these works being analyzed, it arises that they use dispositions that do not interfere with the present work.

SUMMARY OF THE INVENTION

One of the objectives of the present invention is to develop a technique to measure the speed of turbo-compressors; that which is used in alternative internal combustion engines by means of vibrations measure.

Thus, the basic purpose of the invention consists on the non-intrusive measure of vibrations in internal combustion engines turbo superchargers by means of the monitoring of their speed and to determine if there exists an imbalance or another functional fault.

A mathematical algorithm called harmonic correlation, which is one of the novelties of the invention, constitutes the main basis of the present invention for the diagnosis of engines. Said correlation interprets and analyzes the information obtained from the record of vibrations by means of a specially designed layout that does not interfere with the functional aspect of the machine.

So the main objective of the invention is to obtain an extremely simple and economic layout developed to know the angular speed of the referred equipment through specific instrumentation and a prepared circuit to such effect. Moreover, it is to identify the spectral component corresponding to the imbalance of the unit, which is related with angular speed, by means of the analysis of the measured vibrations record.

The invention is based, primarily, on the fact that it is possible to measure the speed of turn through the analysis of vibrations. This technique lays its foundations on the interpretation of the range of frequencies calculated by the FFT algorithm. Taking into account these facts, the angular speed of the turbo-superchargers can be monitored through the analysis of vibrations measured in the frame. Once the turning speed is identified, it is possible to control the component 1×RPM that indicates the level of imbalance of the rotor.

Furthermore, the invention aims at obtaining an extremely economic and constructive layout with the mentioned characteristics, so that it is possible to obtain a compact and light unit that is incorporated to the frame of the supercharger. This means obtaining the required information without interfering with the operation of the equipment under monitoring.

The use of turbo-superchargers is continuously expanding to the field of vehicular engines as well as that of industrial engines. When used in large industrial or marine engines, the manufacturer usually installs devices in the equipment that allow the measure of the angular speed for an appropriate monitoring. When supercharged engines are used for research in labs, it is usual to make modifications in the turbo compressor to be able to measure their speed at all times. For that purpose, optic or magnetic receivers are used to detect the passing of the compressor blades from holes made in the frame of the equipment itself.

There is a wide range of turbo-supercharged engines that are not usually provided with speed measure instrumentation; however, the diagnosis of superchargers takes importance since they are a habitual cause of failure and accidental shutdowns.

To these ends, it is convenient to investigate, in a non-intrusive way, a control technique specially designed for the measure of rotation speed of the equipment. This measure should be performed by specific instrumentation in order to determine the imbalance and its cause component through the analysis of the nature of the vibrations.

However, when there are no tachometers in the turbo-compressors, the analysis is usually complicated due to the appearance of spectral components produced by the engine in addition to others generated by the turbo compressor itself.

As mentioned before, it is possible to obtain the turning speed of the turbo-supercharger by means of the vibrations analysis obtained through the FFT algorithm. (This technique is described in detail further ahead).

The intervention of a person trained in the analysis of vibrations became necessary to use this technique, so as to obtain the correct RPM value. Later on a mathematical algorithm was developed to discern the value of the speed in a completely automatic form, allowing to build an authentic "tachometer" with non-intrusive characteristics.

There have been many industrial engines measured, mainly 12 cylinders, 1500 HP gaseous fuel engines and 16 cylinders, 3000 HP engines. In smaller turbo-compressors there has been experience on equipment installed in 500 HP truck and industrial gaseous fuel engines, among others. To carry out the research, a mini gas turbine was built with a truck turbo-compressor to which an optic tachometer was adapted. This allowed to contrast the measures made through vibrations with those obtained by means of the optic tachometer.

BRIEF DESCRIPTION OF DRAWINGS

In the figures that are attached to the present technical-legal description, it is known that.

In the previously described outlines the same reference characters indicate same or corresponding parts.

DETAILED DESCRIPTION OF THE PREFERRED EMBODIMENT(S)

Figure 1:
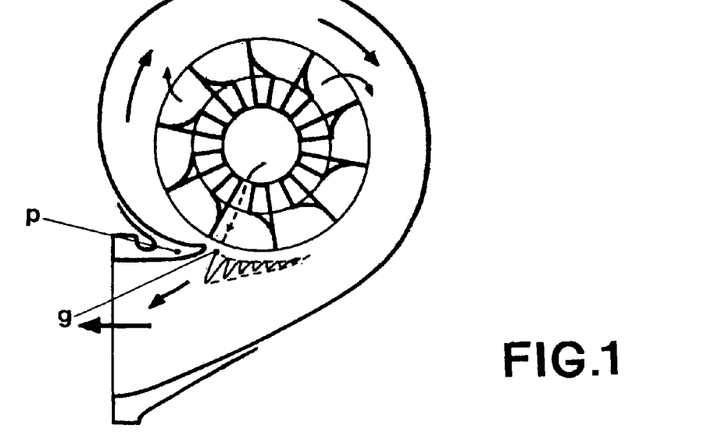
FIG. 1 represents schematically a centrifugal compressor of conventional type.

In general, it is known that turbo machines present the characteristic that their internal flow is systematically ordered and the interactions of the fluid with the structure of the machine do not originate major vibrations (this characteristic is proper to reaction machines; those of action present greater interferences due to not having total flow); however, the presence of the blades makes the flow in the rotor not to be completely uniform. Near the blades the relative speed tends to zero whereas in the center of the space among blades the relative speed is maximum. Taking as an example a centrifugal turbo-compressor, as shown in FIG. 1, and keeping in mind the previously mentioned, it can be deduced that the flow coming out of the rotor and interacting with the stator will not be uniform but rather it will present interferences with a frequency equal to the passing of blades through a fixed point. That is to say that the "pulses" of fluid leaving the rotor hit the stator in a peculiar frequency related to the number of blades and to the speed of turn. Since this interaction is not sinusoidal, the spectrum of vibration of the frame will also present superior harmonics. Without going into further details, the existence of similar phenomena can be inferred in the turbine that drives the turbo-compressor.

Similar peculiarities can be found in most turbo machines; however, this technique is of great interest to turbo superchargers, because these equipments are usually set up without speed sensors.

On these grounds, we can monitor the speed of turn in turbo superchargers through the analysis of vibrations measured in their frame. Once identified the speed of turn, it is possible to control the component 1×RPM that is indicative of the level of imbalance of the rotor.

It is common that centrifugal turbo-compressors, as the one shown in FIG. 1, (in fact they are usually of the diagonal type with the suction practically axial) have blades with less development in the axial direction inserted with others of more longitude in the axial direction of the suction. For example, 14 blades, 7 short and 7 long, facilitates the manufacture of the rotor. This special characteristic makes, in general, that the first harmonic of the spectrum be related with half the number of blades.

Figure 2:
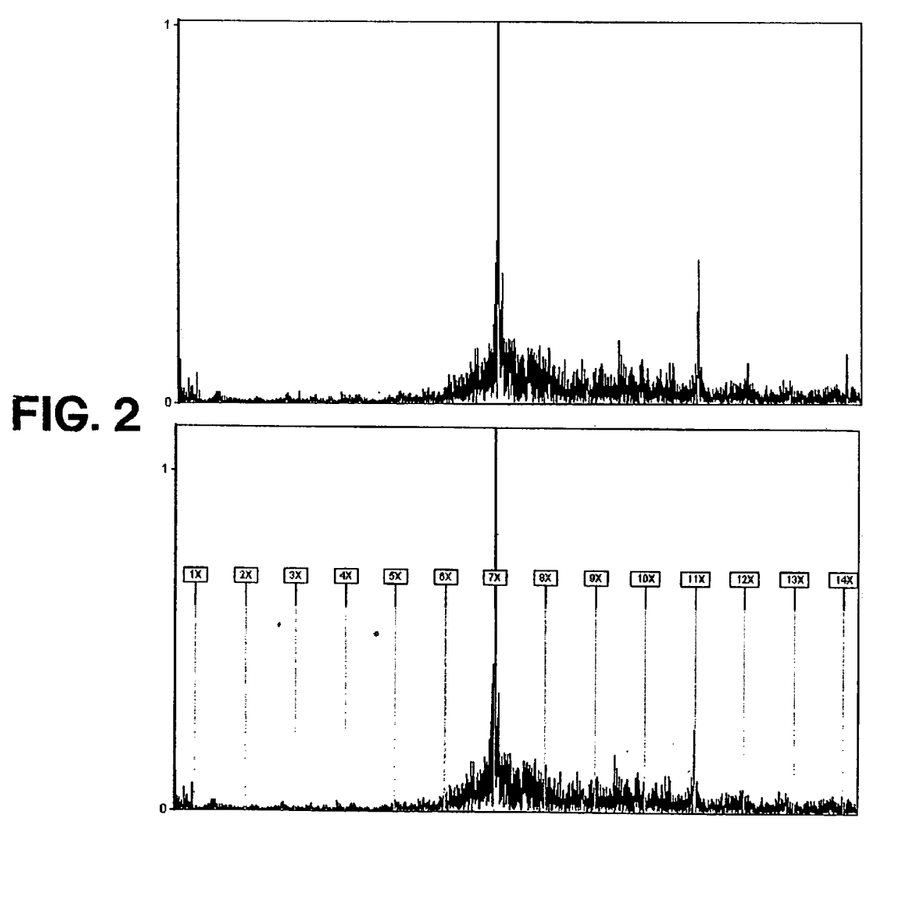
FIG. 2 shows a vibration spectrum measured on a turbo compressor, and the harmonics for a different number of blades. The corresponding harmonics to 7×RPM (½ n° of blades of the compressor), 11×RPM (n° of blades of the compressor), 11×RPM (n° of blades of the turbine) and 1×RPM (unbalance) are clearly observed.

In FIG. 2, a vibration spectrum measured in a turbo-compressor is shown; the harmonic corresponding to 7×RPM (½ n° of blades of compressor), 14×RPM (n° of blades of the compressor), 11×RPM (n° of blades of the turbine) and 1×RPM (imbalance) are clearly observed.

In the shown example, the spectrum is very simple of interpreting. One of the components of the excitation (7×) appears in an area near to a resonance of the structure, this is why it is greatly amplified and it prevails clearly over the background noise. From this, it can be concluded that the speed of turn of the turbo-compressor will be a seventh part of a predominant frequency.

In many other cases, the "expected" components (our example 1×, 7×, 11× and 14×) mix with the aleatory components (background noise) and their interpretation turns out to be extremely complex.

However, when the spectrum is not simple of analyzing, a mathematical function of it allows to improve the detection of significant components in order to calculate the turning speed.

The philosophy of the method is based on finding a pattern of coincidences among the "expected" harmonics with some kind of ponderation. For this, an unprecedented algorithm called "harmonic correlation" has been proposed. Several versions have been made, some of them demonstrating to have a high degree of effectiveness in the detection of the speed of turn.

To make the concept clearer, the philosophy of the originally proposed algorithm (the simplest) is detailed. Later on other explored variants that have given a higher degree of certainty in the detection will be described.

The present invention consists of an equipment and method of measure of speed in turbo superchargers of internal combustion engines by means of an analysis of vibrations.

For the invention to be more comprehensible, in the paragraphs that follow, an accurate description of a preferred way of installation will be given, making reference to the attached illustrative drawings and showing a way to put it into practice without great difficulty. All this as an example of a purely demonstrative but not limitative nature of the invention, whose components can be selected among diverse equivalents without stepping away from the principles established in the present document.

The proposed method consists on the "harmonic correlation". Consequently a function in the domain of the frequency with the following characteristics is generated:

It has harmonics in the "expected" frequencies (those that, more likely, appear during the operation) in the example before mentioned 1×, 7×, 11× and 14×. The fundamental frequency of this signal sweeps the whole spectrum of the signal of the vibration measured, leaving from frequency zero until the maximum of the measured spectrum making vary the frequencies of the superior harmonics simultaneously according to the factors of multiplicity of frequency. This function, called "spectral comb" has an unitary amplitude in the frequency components previously mentioned and it is null for any other frequency value.

A mathematical process involving both signals is carried out: the vibration spectrum (calculated by means of FFT) and the "spectral comb". This process consists on generating a function in which each point is obtained as a result of the adding of the products point to point between the vibration spectrum and the "spectral comb". This value is assigned to a frequency equal to that of the fundamental component of the spectral comb. As the comb signal sweeps the spectrum, it generates the different points of the resulting function. This process is similar in conceptual terms to the "cross correlation" function used for the processing of signals in the time domain. The main difference lies on the fact that this is a calculation in the domain of the frequency and that one of the signals (spectral comb) is generated during the processing; it is not a measured signal. These concordant points gave way to the name of the process "harmonic correlation"

When the 1× component of the spectral comb agrees with the frequency corresponding to the speed of turn of the turbo-compressor, the harmonic correlation should present a maximum allowing to discern the speed of turn easily.

Figure 3:
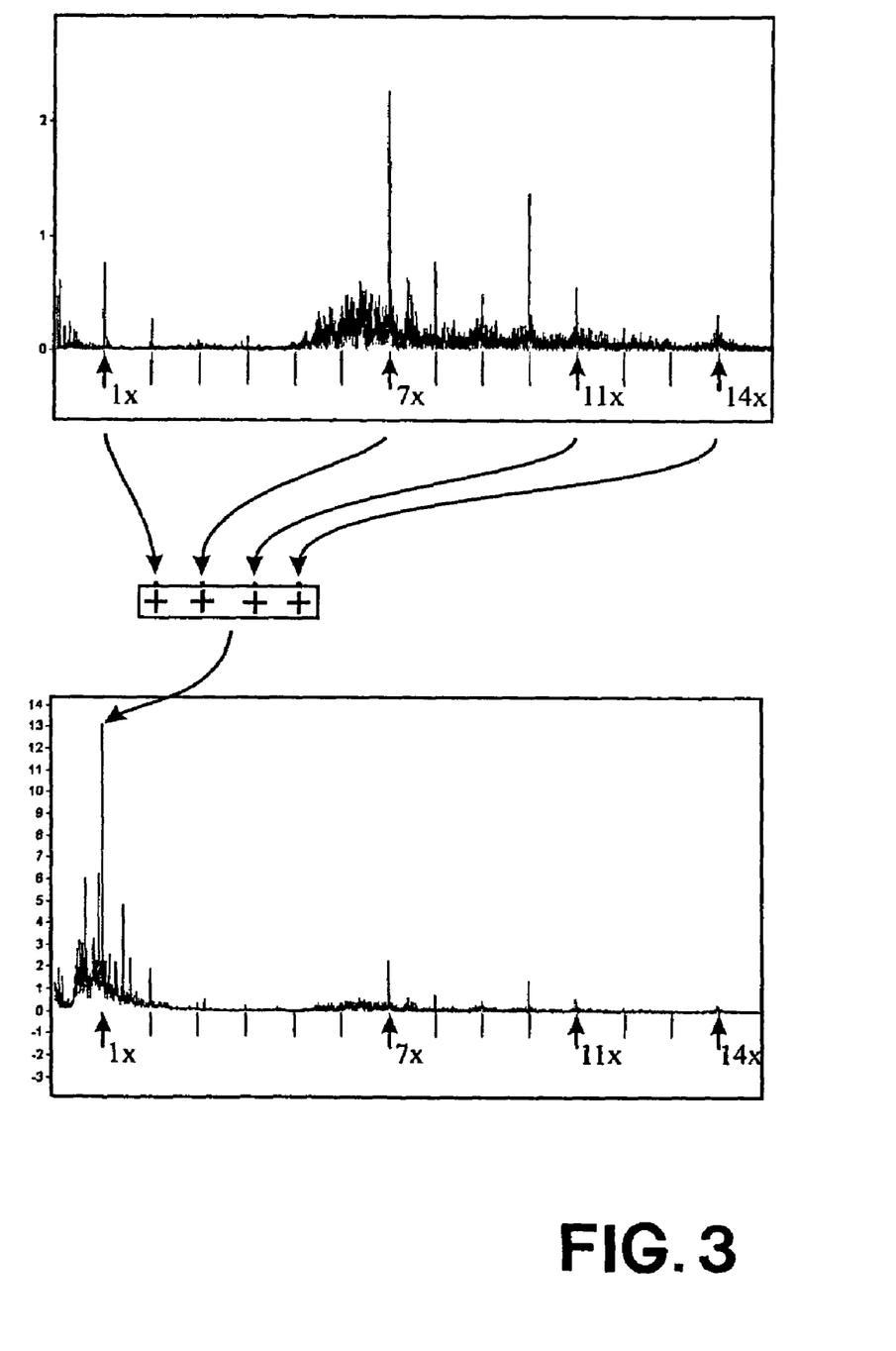
FIG. 3 represents in simplified manner how the function harmonic correlation is built. The particular case of this figure shows the coincidence between the components 1×RPM of the spectral comb and the speed of turn that yields as a result a maximum of the function harmonic correlation.

FIG. 3 represents in simplified manner how the function harmonic correlation is built. The particular case of this figure shows the coincidence between the components 1× of the spectral comb and the speed of turn giving as a result a maximum of the function harmonic correlation.

Another way to explain the process is to suppose that each component of the spectral comb acts like a pass band filter and that each point of the harmonic correlation function is obtained by accumulating the frequency components of the spectrum that enter the bands of the filter.

To reduce the uncertainty in the results, numerous variants of this method have been explored and will be described later on.

As previously shown, the Harmonic Correlation function is calculated in the following way:

$$CA(x) = \sum_{i=1}^{n} E(i \cdot x) \cdot PE(i) \tag{1}$$

Where:
CA(x): Harmonic Correlation Function
E(x): Spectrum Function, calculated with TRF of the sensed signal
PE: Spectral Comb Function
n: number of harmonics to consider
x: frequency, varies between zero and the maximum frequency obtained by FFT
PE(i)=1 ∀i=1, i=AC, i=AC/2, i=AT
PE(i)=0 for every other "i" values In the original version of the algorithm, "n" is equal to the quantity of blades of the turbo-compressor or turbine (the greatest of both) and the Spectral Comb function is one for the significant components and zero for those not significant.

This way, for the previously developed example (number of blades of compressor equal to 14 and of turbine 11), the Harmonic Correlation does the following:

$$CA(x)=E(x).PE(1)+E(7.x).PE(7)+E(11.x).PE(11)+E(14.x).PE(14) \tag{2}$$

And being the components of the Spectral Comb equal to one in said values, the equation is:

$$CA(x) = E(x) + E(7 \cdot x) + E(11 \cdot x) + E(14 \cdot x) \qquad (2b)$$

Apart from the provided description of the original harmonic correlation, variants were developed with the intention of increasing the certainty in the detection of the speed of turn. Following, the proposed variants are described:

This variant consists on changing the addition of expression (1) for multiplication, so the formula reads:

$$CA(x) = \prod_{i=1}^{n} E(i \cdot x) \cdot PE(i) \qquad (2)$$

In the case of the harmonic correlation by addition, the fact that there are several high components in coincidence with the spectral comb, guarantees the existence of a high value of the CA function, even if one of them is very small.

When using the product function, the condition for the CA function to be high is that there are coincidences with all the bars of the spectral comb, since the existence of at least one low component makes the total result decrease and if this component were near to zero, it notably diminishes the CA function at that point.

With this variant, for the previously developed example, the Harmonic Correlation calculated with (2) transforms into the following:

$$CA(x) = (E(x) \cdot PE(1)) \cdot (E(7 \cdot x) \cdot PE(7)) \cdot (E(11 \cdot x) \cdot PE(11)) \cdot (E(14 \cdot x) \cdot PE(14)) \qquad (4)$$

And the values of PE(1), PE(7), PE(11) and PE(14) being equal to one, the formula is simplified to:

$$CA(x) = E(x) \cdot E(7 \cdot x) \cdot E(11 \cdot x) \cdot E(14 \cdot x) \qquad (4b)$$

This version works better with 1X component of spectral comb equal to zero

This alternative process consists on adding or multiplying not only the previously mentioned values in the Harmonic Correlation (addition or multiplication), but also on including some proximal values of a variable width band. The simplest version of this variant is that which considers equal bandwidth for any harmonic of the speed of rotation.

This way formula (1) transforms into the following:

$$CA(x) = \sum_{i=1}^{n} \left( \sum_{j=-m}^{m} E(i \cdot x + j) \right) \cdot PE(i) \qquad (5)$$

Where:
j: gradual increase of sampled values
m: semi width of the band to consider These bands of included values are in general small (semi widths of 2 to 3 additional values).

And for the discussed example during the explanation, formula (2) transforms into:

$$CA(x) = \qquad (6)$$
$$(E(x-1) \cdot E(x) \cdot E(x+1)) \cdot PE(1) + (E(7 \cdot x - 1) \cdot E(7 \cdot x) \cdot E(7 \cdot x + 1)) \cdot PE(7) +$$
$$(E(11 \cdot x - 1) \cdot E(11 \cdot x) \cdot E(11 \cdot x + 1)) \cdot PE(11) +$$
$$(E(14 \cdot x - 1) \cdot E(14 \cdot x) \cdot E(14 \cdot x + 1)) \cdot PE(14)$$

The same can be implemented in multiplication, where the only thing to change in the formula is to replace the addition for products.

The purpose of the method is to include the proximal values foreseeing the possible deviations of the harmonics. The fundamental reason is that the FFT algorithm generates a discreet function with a finite resolution which produces a light uncertainty about the exact location of the harmonics. Said uncertainty is of the spectral resolution order.

A refinement of the previous method consists on increasing the width of the inclusion band of proximal values as the value of the harmonic increases (as the value of "i" increases). This is based on the fact that the higher the multiple of the harmonic is, the higher the possibility of having deviations is, due to the following:

The Leakage phenomenon takes place, because during the occurrence of the sampling window, it is practically impossible to capture an exact number of cycles. Even when considering windows leading to minimize the effect are used, the leakage produces a widening of the spectrum components.

Another cause for widening is that, during measure, the speed of turn varies slightly; this originates a small modulation in frequency and in amplitude and it means the appearance of lateral bands very near to each component.

As example, for the discussed example during the explanation, formula (6) transforms into:

$$CA(x) = E(x) \cdot PE(1) + \qquad (7)$$
$$(E(7 \cdot x - 3) \cdot E(7 \cdot x - 2) \ldots E(7 \cdot x + 2) \cdot E(7 \cdot x + 3)) \cdot PE(7) +$$
$$(E(11 \cdot x - 5) \cdot E(11 \cdot x - 4) \ldots E(11 \cdot x + 4) \cdot E(11 \cdot x + 5)) \cdot PE(11) +$$
$$(E(14 \cdot x - 7) \cdot E(14 \cdot x - 6) \ldots E(14 \cdot x + 6) \cdot E(14 \cdot x + 7)) \cdot PE(14)$$

In this case, the following values have been taken: one value for the 1× component, 7 values for the 7× component, 11 values for the 11× component and 15 values for the 14× component (rounded to the next superior odd to 14).

It is to expect that inside each of the bands indicated in the two previous points, the values corresponding to harmonic multiples of the speed of turn are the highest inside said bands. Therefore, a variant outlined on the previous methods was to include a single value of the Spectrum function for each component, but the included value is the maximum of the analyzed band. In this way, the calculation formula of the Harmonic Correlation is the same as (1) in the event of addition, or the same as (3) in the event of multiplication, but each one of the E(x.i) is the maximum value of the band. These bands are defined as indicated in the two previous variants.

In the last two described algorithms (considering "bands" of values), components that may not have mathematical relationship among them are included or combined.

On the other hand, in the original algorithm of harmonic correlation (formulas (1) and (3)) the combinations of harmonics are analyzed with mathematical justification, but some combinations of intermediate components are skipped. For example, when advancing a step the value of x in (1) and in (3) 6 components are skipped for the harmonic number 7, 10 components are skipped for the harmonic number 11 and 13 components are skipped for the harmonic number 14. These skipped components can have important values, for which reason the algorithm, in those cases, could not be certain.

In order to explore all the possible combinations of values, so much for the harmonic correlation by addition as for the harmonic correlation by multiplication, other algorithms were developed. These have the same philosophy as (1) and (3), but for each one of the values of CA(x) the results are analyzed and the highest value in the different possible combinations is chosen, making advance, one step at a time of the spectral resolution, the value of the maximum multiplier used (n, in our case equals to 14). Formula (1) would use in this case the highest analyzed value with the following formula:

$$CA(x)_k = \sum_{i=1}^{n} E(i \cdot x + k \cdot i/n) \cdot PE(i) \qquad (8)$$

Where:

k: varies between 1 and value of n (the highest between the quantity of blades of the turbine and the compressor)

For our example, each one of the analyzed values would arise as the highest among the following values obtained from formula (8):

$CA(x)_1 = E(x).PE(1) + E(7x).PE(7) + E(11x).PE(11) + E(14x).PE(14)$ (8a)

$CA(x)_2 = E(x).PE(1) + E(7x+1).PE(7) + E(11x+1).PE(11) + E(14x+1).PE(14)$ (8b)

$CA(x)_3 = E(x).PE(1) + E(7x+1).PE(7) + E(11x+2).PE(11) + E(14x+2).PE(14)$ (8c)

$CA(x)_4 = E(x).PE(1) + E(7x+2).PE(7) + E(11x+2).PE(11) + E(14x+3).PE(14)$ (8d)

$CA(x)_{14} = E(x+1).PE(1) + E(7x+6).PE(7) + E(11x+10).PE(11) + E(14x+13).PE(14)$ (8n)

Formula 3 (simple harmonic correlation by product or would use in this case the highest of the analyzed values with the following formula:

$$CA(x) = \text{The biggest of } \langle CA(x)_k \rangle = \prod_{i=1}^{n} E(i \cdot x + k \cdot i/n) \cdot PE(i) \qquad (9)$$

Where:

k: varies between 1 and n value (the highest between the number of blades of the "AT" turbine and the "AC" compressor)

For our example, each one of the analyzed values would arise as the highest of the following values yielded by formula 9:

$CA(x)_1 = E(x).PE(1).E(7x).PE(7).E(11x).PE(11).E(14x).PE(14)$ (9a)

$CA(x)_2 = E(x).PE(1).E(7x+1).PE(7).E(11x+1).PE(11).E(14x+1).PE(14)$ (9b)

$CA(x)_3 = E(x).PE(1).E(7x+1).PE(7).E(11x+2).PE(11).E(14x+2).PE(14)$ (9c)

$CA(x)_4 = E(x).PE(1).E(7x+2).PE(7).E(11x+2).PE(11).E(14x+3).PE(14)$ (9d)

$CA(x)_{14} = E(x+1).PE(1).E(7x+6).PE(7).E(11x+10).PE(11).E(14x+13).PE(14)$ (9n)

A great amount of tests on turbo compressors of different characteristics have been performed; they were analyzed with all the techniques before mentioned and finally the results showed high effectiveness.

It was observed that in some machines, due to their geometric and operational characteristics, there is predominance of some components over others. Following this reasoning, in these equipments, certainty can be increased even more using a convenient consideration of the bars of the comb that is to say that not all of them have the same value. For example, in the case of some measurement in which there appear low frequency components due to the interferences produced by the movement of the engine, it is convenient to use a smaller value for the 1× component of the comb.

All the above mentioned variants were also proven with previous processing known as self spectrum. Said process consists on applying the FFT algorithm to the auto correlation function of the measured signal. This technique notably diminishes the aleatory components.

The unprecedented contribution that motivates the present invention is the methodology based on the use of the novel function nominated "Harmonic Correlation". Besides the processing method described, a digital electronic measuring equipment that performs automatically all the functions required to present on a screen the measure of the speed of turn.

This equipment, illustrated in FIG. 4, digitally acquires samples of the vibration signal coming from the vibration captor (generally piezo-electric); it stores them in a memory and, later on, it processes them by means of the FFT algorithm and the "harmonic correlation". Finally, it either presents, on a visualization or digital screen, the resulting signal in the domain of the frequency or the indication in revolutions per minute.

Figure 4:
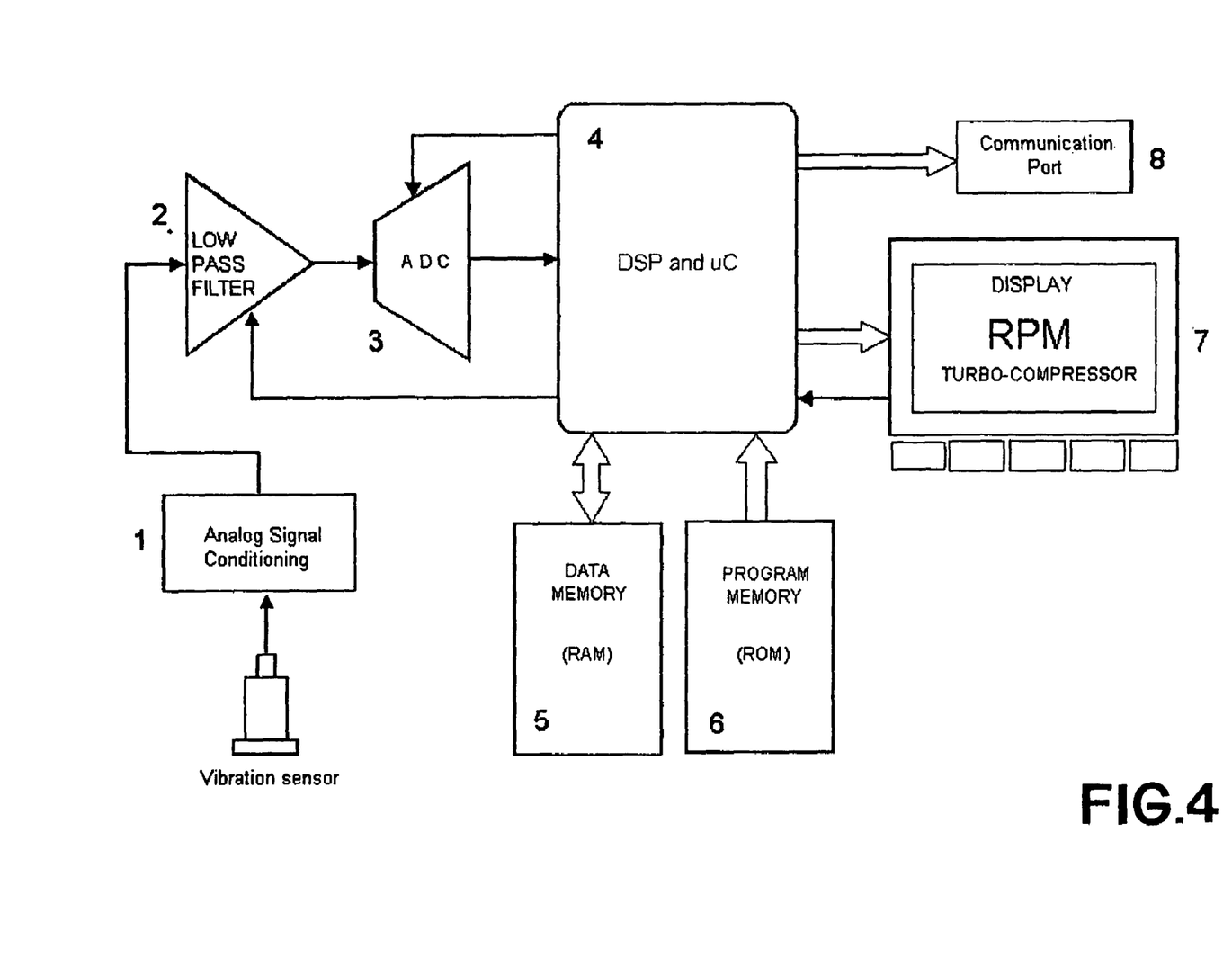
FIG. 4 consists of the block diagram selected as the realization example to configure the equipment used in the automatic measure of the angular speed in turbo compressors.
Figure 5:
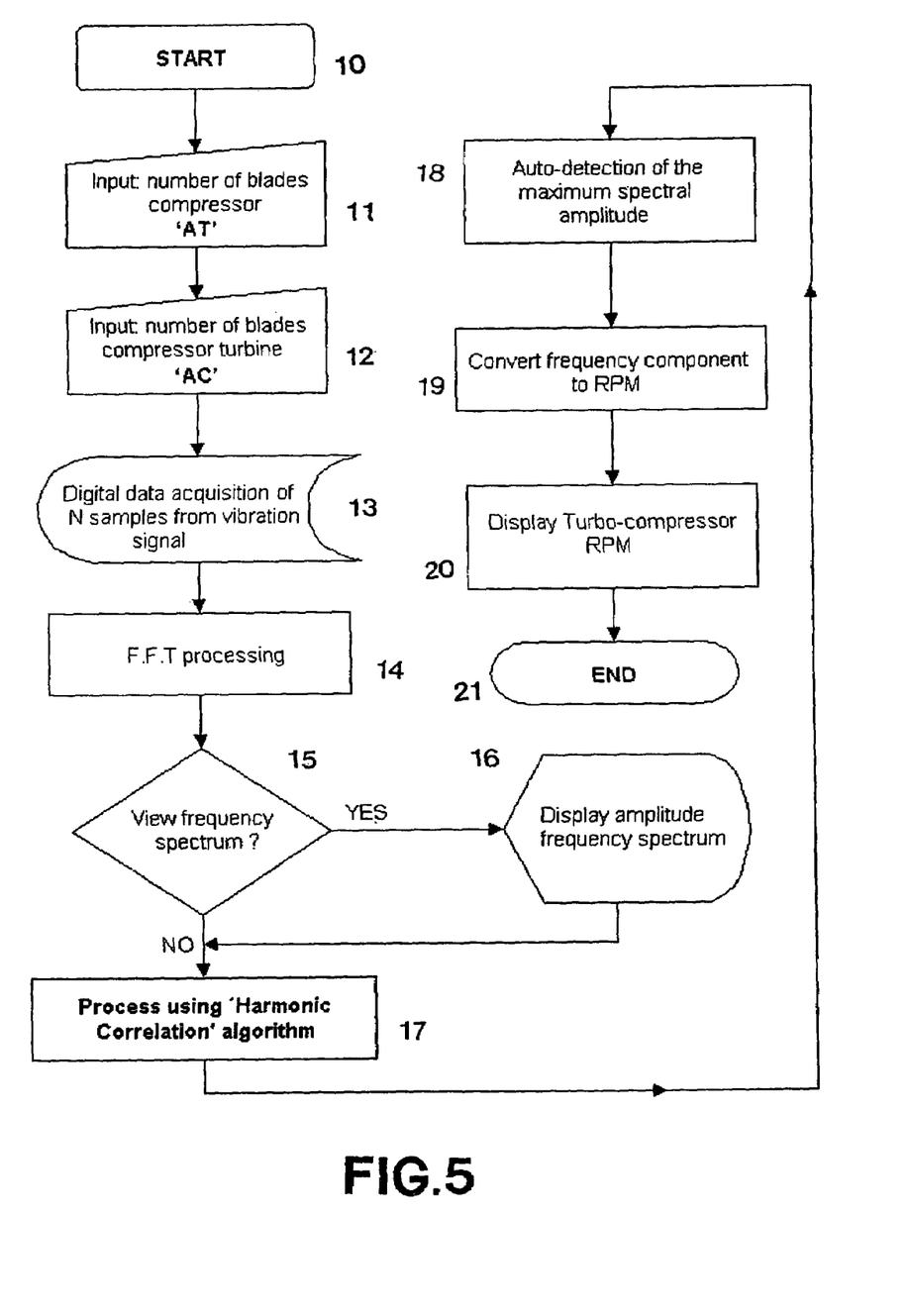
FIG. 5 represents a "Flow Diagram" which shows the steps and available options in the software of the measuring equipment of the angular speed in turbo compressors.

According to the illustration in FIG. 4, the equipment has the following functional blocks:

An analogical signals conditioning device for vibration sensors (generally piezo-electric) 1.

A low pass filter, anti-aliasing, programmable 2.

An analogical-digital converter with programmable sampling frequency 3.

A digital signals processor 4 that contains in its programs memory 6 all the algorithms in "software" form, like FFT, auto spectrum and harmonic correlation.

A memory bank of pre signal processing 5 to store the acquired samples.

A programs memory 6.

A digital screen 7 where all the results of the instrument are presented and the configuration parameters are introduced.

A communication port 8.

The signal conditioning block consists of an analogical electronic circuit that adapts the levels of tension or load coming from the vibration sensor 9 which yields during its exit a signal with the appropriate range of tension to be entered in the filtration stage and later in the digital conversion.

The following block 2 represents an anti-aliasing low pass filter, with a programmable cut frequency and with a diminishing slope in the −24 dB per octave passing band. It is essential in order to avoid spectral overlapping error when the input signal presents frequency components of over twice the value of the sampling frequency.

The analogical-digital converter block 3 is a circuit that acquires a sample of the analogical signal conditioned by the previous stages, quantifies it and codes it in a digital binary value of 12 bits. The sampling frequency is programmable.

The digital processor of signals 4 consists of the digital computer that executes the programs of this automatic measuring system. It also controls the cut frequency of the low pass filter, the frequency of sampling of the analogical-digital converter, the communication through the compatible port RS232 and the screen where the results of the measure are presented and the parameters of the turbo compressor are entered.

The data memory 5 is the RAM memory of the system, also necessary to store such temporary data as: the samples of the digitized analogical signal, the results of the TRF processing and of the harmonic correlation.

The programs memory 6 is the ROM memory (only reading) of the system. It stores the procedures and functions of the FFT algorithm, the harmonic correlation and the other necessary programs for the operation of the equipment.

The screen 7 is a technological visualization of liquid crystal where the different screens that interact with the operator of the equipment are presented: from the screens for the load of the initial parameters to the ones that sample the result of the measure.

Communication port 8 through which RS232 serial communication with a compatible PC can be established to download measure and make low level configurations of the equipment.

Once established the different components of the version of the invention and developed to explain their nature, the description of its parts and the result they provide along with their functional and operative relationship is supplemented.

It is convenient to clarify that as several algorithms have been presented for the harmonic correlation, they have been experimented with repeatedly and this has proved that each one of the variants exposed in this text presented more accurate results than the immediately previous ones. Of all, the variant expressed in formula (9) proved to be the most accurate; as demonstrated by experimental tests carried out on turbo compressors of different types and under different working conditions, being the reached effectiveness of this last algorithm 97%. However, the other mentioned variants require lower calculation times and, in particular, the algorithm represented in expression (7) showed a slightly lower effectiveness than (9), but again with the advantage of needing less calculation time. For this reason, for most of the cases in which the measure is made, the use of expression (5), which derives from referred expression (7), is proposed. Exception should be made that for those cases in which a more precise calculation is required, there exits the option of applying expression (9).

The digital electronic equipment of measure in FIG. 4 digitally acquires samples of the vibration signal coming from the vibration captor; it stores them in a memory and, later on, it processes them by means of the FFT algorithm and the "harmonic correlation". Finally, it either presents, on a visualization or digital screen, the resulting signal in the domain of the frequency or the indication in revolutions per minute of the speed of turn.

The equipment has the functional blocks described that include a digital acquiring device of analogical signals with configurable sampling frequency 13 and programmable anti-aliasing 2 filter; a memory bank 5 of pre-processing signal to store the acquired samples; a digital processor of signals 4 that contains in memory 6 all the algorithms in software form like the FFT, the auto spectrum and the "harmonic correlation". It also has a digital screen 7 where all the results of the instrument are presented.

The functionality and practicality of use of this electronic instrument lies in the fact that the operator must only enter the technical characteristics of the turbo compressor such as: the number of blades of the turbine and the number of blades of the compressor. This information is necessary so that the harmonic correlation algorithm can build "comb signal" and this way be able to give a reading of the speed of turn.

As it can be understood from all that has been mentioned, it is a non intrusive measuring equipment, since it does not need of any modification in the turbo compressor; it is only necessary to establish the mechanical contact between the frame and the vibrations sensor. In case of need, laser vibration technology could be used to measure vibration and in that case mechanical contact would be nonexistent.

1°—The sensor must be placed on the collecting frame (scroll case) which possesses compatible levels of temperature to the manipulation of the sensor without needing special cautions as it would happen with the turbine frame of escape gases. It can be placed in radial direction (vertical or horizontal) or in axial direction. Experience indicates that any of the three directions gives signals clear enough; however, it is a good practice to carry out measuring in the three directions to look for identical results thus ensuring quality. The measuring condition improves if there is a perfectly flat surface where to place the sensor with magnetic base. In the event of equipments in which routine measures are carried out, it is advisable to place a small ferrous-magnetic disk to which the magnetic base of the sensor can be adhered. This disk should be fixed with some resin or glue resistant to temperatures of more than 100° C. and, after hardening, it should have a rigid consistency.

2°—Using the signal wire belonging to the sensor, it should be connected between the signal input of the measuring equipment and the connector of the sensor itself. This way the electric signal, load or current, proportional to the prevailing acceleration on the frame of the turbo, will be present in the entrance of the analogical signal of the measuring equipment ready to be acquired through the digital sampling technique.

3°—The operator should start the measuring equipment, of size and characteristics similar to a portable computer or a "hand-held" computer which will have incorporated in its program memory all the routines, functions and software procedures needed to process the measured signal. Once activated, the equipment automatically presents to the operator the fields to enter, at least, the following data:

AT=Number of blades of the compressor turbine.

AC=Number of blades of the compressor.

Frequently, compressors have such a disposition of blades that half of them present a geometry slightly different from the other half. Basically this can be noticed in the air input area when it has axial direction. Specifically, half the blades have a bigger axial length than the other half. In these cases (practically all the cases that are usually presented), the data to enter will then be:

AT=Number of blades of the compressor turbine.

AC/2=Number of short or long blades of the compressor.

AC=total Number blades of the compressor.

Once these values are entered, the equipment will be set to begin measuring.

4°—The program of the equipment presents a button on screen to begin the measuring. When pressed, the equipment begins to acquire and digitalize "N" samples of the entrance signal and stores them in the RAM data memory. Immediately after completing the acquisition, the FFT processing turbo frame routine begins to be executed; it will be present in the entrance of the analogical signal of the measuring equipment ready to be acquired through the digital sampling technique.

5°—The program offers as an option to see on screen the spectrum of the measured signal. Apart from the selected option, it continues with the execution of the Harmonic Correlation algorithm which will give as a result a correlation spectrum in which the component of maximum amplitude is automatically searched for. As previously mentioned, of all the algorithms proposed in the memory, the last is the one that has demonstrated to possess a higher degree of effectiveness and it is the most convenient for this application.

6°—Having found the component mentioned in the previous point, its value of frequency of cycles per second (Hz) becomes RPM (Revolutions Per Minute) and this last value is presented on screen as the value of the speed of turn of the turbo-compressor equipment. From here on, the equipment is capable of repeating or performing a new measuring, which being performed on the same turbo, will repeat the described sequence as from point 4°.

In this way one of the constructive possibilities that lead to materializing the invention and the way it operates have been pointed out; being also understood its specific application and supplemented the documentation with the synthesis of the invention included in the following claims:

What is claimed is:

1. Method of speed measure on a turbo supercharger of an internal combustion engine by means of vibrations analysis, comprising the steps of:
    measuring vibrations in said turbo supercharger, said measuring step comprising
    (a) incorporating software for data processing to integrate measuring equipment to a ROM memory of a computer;
    (b) connecting a vibration sensor to the measuring equipment and displaying the vibration sensor on a frame of a turbo-compressor;
    (c) entering into the measuring equipment, the number of blades of a turbo supercharger turbine and then, a number of blades of the turbo supercharger compressor;
    (d) initiating measuring and digitalizing of N samples of an entrance signal and storing the samples in a RAN memory;
    (e) obtaining frequency spectrum components of a vibration signal measured by means of FFT;
    (f) obtaining a PE function which together with the FFT function allows determination of a harmonic correlation function applying the following expression:

$$CA(x) = \text{The biggest of } \langle CA(x)_k \rangle = \prod_{i=1}^{n} E(i \cdot x + k \cdot i/n) \cdot PE(i) \quad (9)$$

Where:
    k=is a value between 1 and n,
    CA(x)=Harmonic Correlation Function,
    E(x)=Spectrum Function, calculated with a TRF of the sensed signal,
    PE=Spectral Comb Function,
    n=Number of harmonic to consider,
    x=Frequency of a value between 0 and a maximum frequency obtained in the FFT; and
    (g) obtaining RPM starting from a frequency corresponding to a maximum value of the CA function.

2. The method of claim 1, wherein said second number entering step comprises entering a second number which is one-half of the number of compressor blades in the event said compressor has short and long blades.

3. The method according to claim 1, wherein obtaining of the harmonic correlation function CA is performed using the following expression:

$$CA(x) = \sum_{i=1}^{n} E(i \cdot x) \cdot PE(i) \quad (1)$$

Where:
CA(x)=Harmonic Correlation Function
E(x)=Spectrum Function, calculated with the FFT of the sensed signal
PE=Spectral Comb Function
n=number of harmonics to consider
x=Frequency which varies between zero and the maximum frequency obtained by FFT.

4. The method according to claim 1, wherein the obtaining of the harmonic correlation function CA is performed using the following expression:

$$CA(x) = \sum_{i=1}^{n} E(i \cdot x) \cdot PE(i). \quad (3)$$

5. The method according to claim 1, wherein the obtaining of the harmonic correlation function CA is performed using the following expression:

$$CA(x) = \sum_{i=1}^{n} \left( \sum_{j=-m}^{m} E(i \cdot x + j) \right) \cdot PE(i) \quad (5)$$

Where:
j=increase by steps of sampled values m=half width of a strip to consider.

6. A method of speed measure on a turbo supercharger of an internal combustion engine by means of vibrations analysis, comprising the steps of:
    measuring vibrations in said turbo supercharger comprising
    (a) incorporating software for data processing to integrate a measuring equipment to a ROM memory of a computer;
    (b) connecting an acceleration sensor to the measuring equipment and displaying said sensor in respect to a collecting frame of a compressor;
    (c) entering into the measuring equipment the number of blades of the turbo supercharger turbine and then, a number of blades of the turbo supercharger compressor, and a total number of blades of the compressor in order to build spectral comb function PE;
    (d) initiating the measuring and digitalizing of N samples of an entrance signal and storing the samples in a RAM memory;
    (e) obtaining frequency spectrum components of a vibration signal measured by means of EFT;
    (f) obtaining a harmonic correlation function CA by applying an algorithm forming said software; and
    (g) determining a component of a highest amplitude.

7. A computerized system for implementing a method of speed measure on a turbo supercharger of an internal combustion engine by means of vibrations analysis, said system comprising:
- a computer having a ROM memory with means for generating by applying Fourier's transformation (FFT) a spectrum of frequencies from "N" registered data; means for generating a "spectral comb" function from a fundamental component of a frequency and its "n" harmonics, means for introducing a quantity of blades of a certain turbine and compressor; means for processing both spectrum of vibration of a measured signal and a "spectral comb" function by means of a "CA" (harmonic correlation) algorithm and detecting a spectral component of maximum amplitude; and means for converting the maximum value of "CA" frequency obtained to "RPM"; and
- a vibration sensor connected to said computer.

8. Equipment for performing a method of speed measure on a turbo supercharger of an internal combustion engine by means of vibrations analysis comprising:
- at least one sensor;
- a conditioning device for Analogical signals coming from the at least one sensor;
- an anti-aliasing, programmable low pass filter;
- an analog-digital converter with programmable sampling frequency;
- a digital signals processor that contains in a programs memory a plurality of algorithms including FFT, auto spectrum and harmonic correlation; a memory bank of pre signal processing to store acquired samples;
- a digital screen for presenting results and for introducing configuration parameters;
- a program memory containing all digital functions for implementing a method of harmonic correlation; and
- a communication port.

9. The equipment according to claim 8, wherein said at least one sensor comprises at least one of an acceleration sensor, a speed sensor, and a laser vibration technology sensor.

10. The equipment according to claim 8, wherein the at least one sensor comprises a vibration sensor and further comprising a signal conditioning device including an electronic analogical circuit adaptor of tension (voltage) or load (charge) levels coming from the vibration sensor whose output provides a signal with an appropriate range of tension (voltage) for input to the filter and the converter.

11. The equipment according to claim 8, wherein the anti-aliasing low pass filter has a programmable cut frequency and a diminishing slope in a −24 dB per octave passing band.

12. The equipment according to claim 8, wherein the analog-digital converter with programmable sampling frequency acquires a sample of an analog signal, quantifies said analog signal and codes said analog signal in a digital binary value of 12 bits.

* * * * *

UNITED STATES PATENT AND TRADEMARK OFFICE
CERTIFICATE OF CORRECTION

| | | |
|---|---|---|
| PATENT NO. | : 7,283,923 B2 | Page 1 of 1 |
| APPLICATION NO. | : 11/365204 | |
| DATED | : October 16, 2007 | |
| INVENTOR(S) | : Daniel Oscar Barila et al. | |

It is certified that error appears in the above-identified patent and that said Letters Patent is hereby corrected as shown below:

In Column 13, claim 1, line 44, "RAN" should read --RAM--.

In Column 14, claim 6, line 64, "EFT" should read --FFT--.

Signed and Sealed this

First Day of January, 2008

JON W. DUDAS
*Director of the United States Patent and Trademark Office*